May 13, 1924.
H. KOPPERS
1,493,993
PROCESS AND APPARATUS FOR THE RECOVERY OF ZINC
Filed July 5, 1921   3 Sheets-Sheet 2
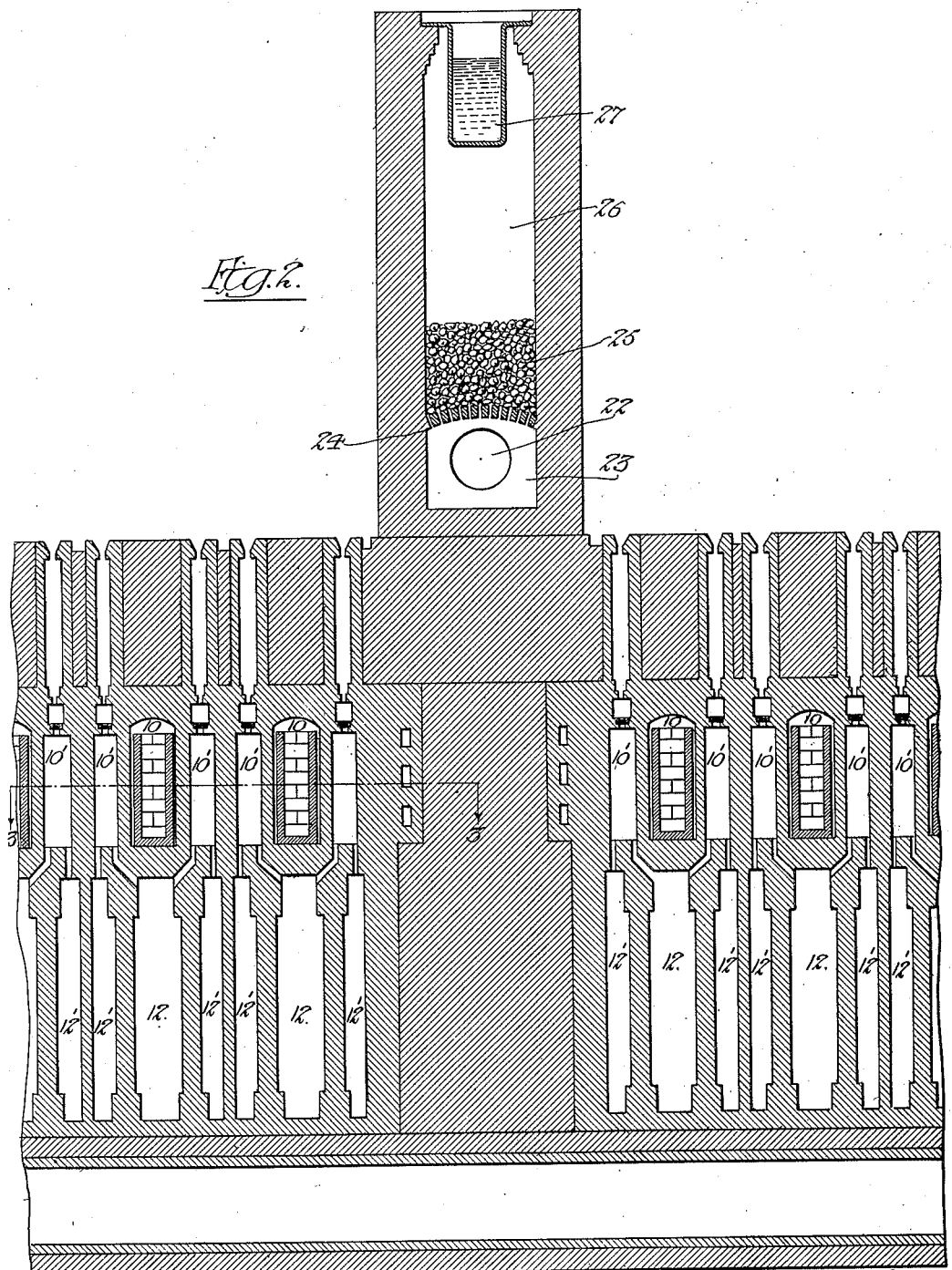

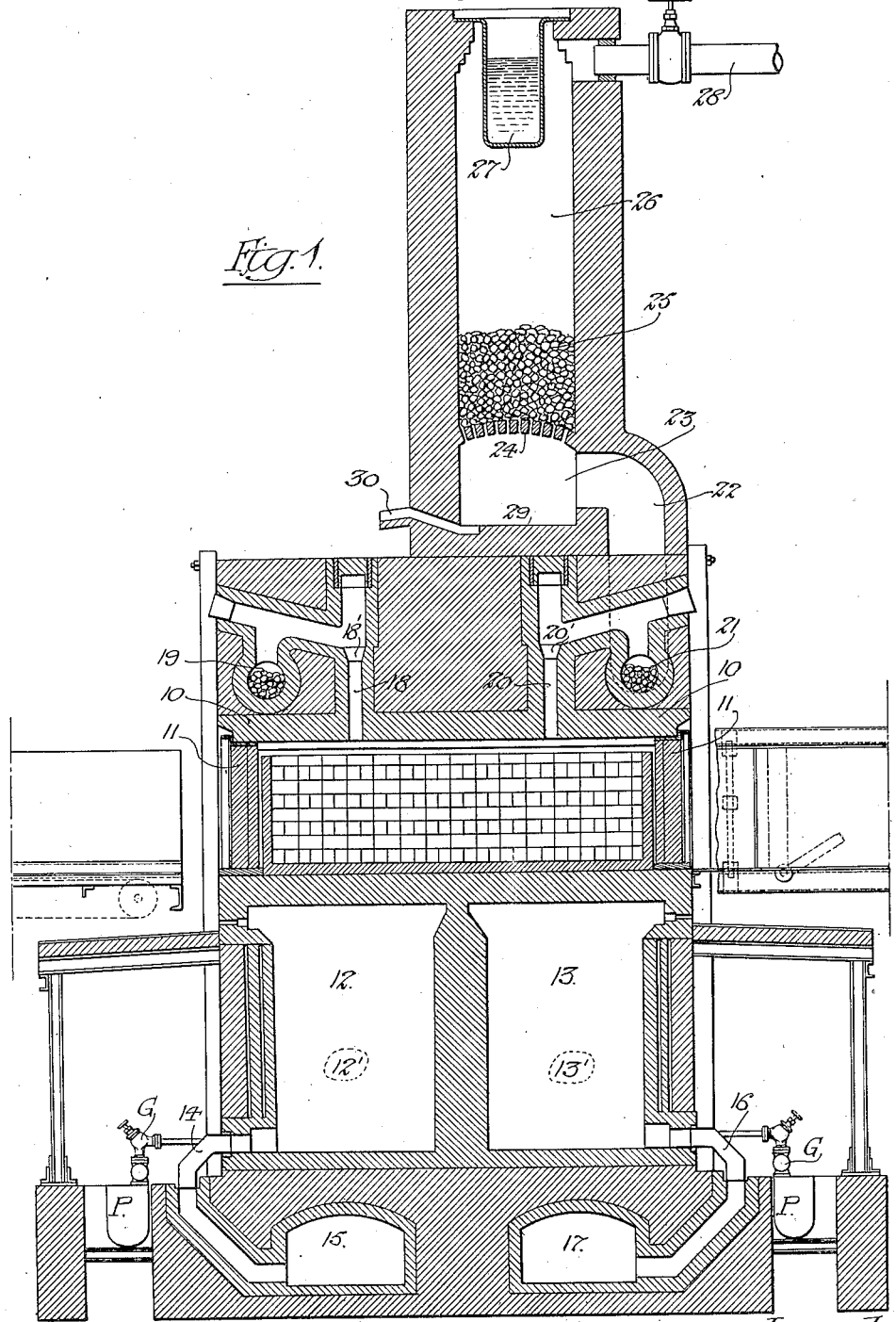

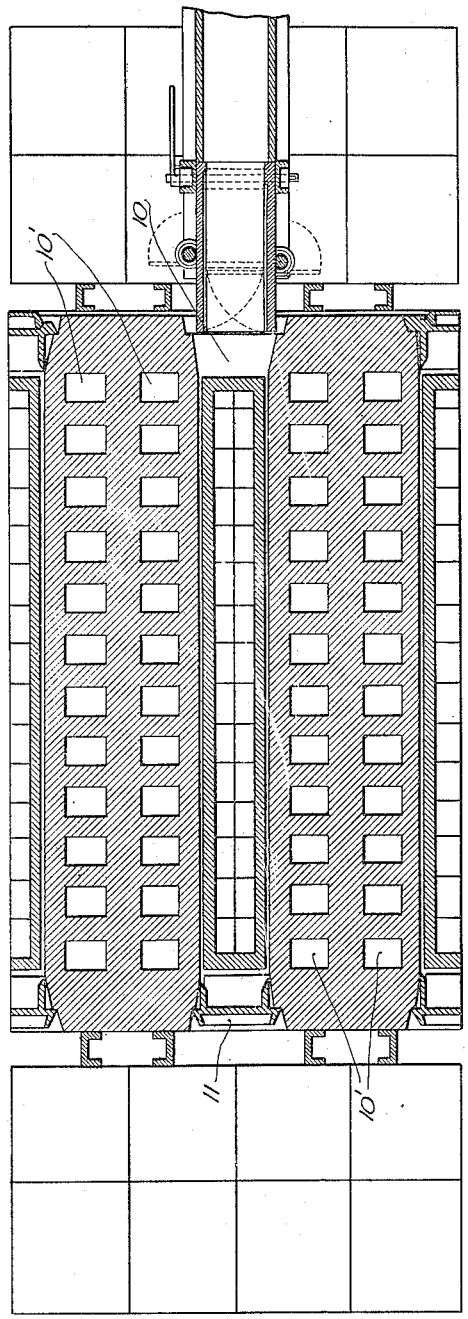

Patented May 13, 1924.

1,493,993

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

PROCESS AND APPARATUS FOR THE RECOVERY OF ZINC.

Application filed July 5, 1921. Serial No. 482,618.

*To all whom it may concern:*

Be it known that I, HEINRICH KOPPERS (assignor to The Koppers Development Corporation, a corporation of Pennsylvania), a citizen of Germany, residing in Essen-Ruhr, Germany, have invented a new and useful Improvement in Processes and Apparatus for the Recovery of Zinc (for which I filed application in Germany on or about April 15, 1918), of which the following is a specification.

In the recovery of zinc and analogous volatile metals from their ores, the ores, such as the oxide ores of zinc, are subjected to a distillation process for the purpose of volatilizing the metallic constituents of the ores. From the distillate the metallic constituents are subsequently precipitated and thus recovered. There are a number of difficulties in this process, however, among which may be mentioned the fact that the metal is not recovered in a pure form, either chemically or physically, but must be subjected to subsequent expensive and difficult refining operations.

The present invention relates to the recovery of such volatile metals as zinc from ores, and has for an essential object to recover the metal in high grade, substantially pure form, by effecting, during the distillation process, a separation of the products of distillation in such manner that the zinc vapor is isolated, together with a proper quantity of carbon monoxide, from the other vapors which arise during the distillation, thereby permitting the substantially clean mixture of zinc vapor and carbon monoxide to be treated for the immediate recovery of practically pure zinc. For this purpose the invention contemplates effecting the distillation process in two stages, a first stage in which the vapors which impart impurities to the metal are drawn off and isolated, and a second stage in which the vapors containing practically only zinc vapors and carbon monoxide are separately drawn off from the distilling ore mixture for the immediate recovery of the zinc in practically pure form. The vapors which rise at the beginning of the distillation consists largely of steam, carbonic acid, carbon monoxide, cadmium vapors, etc.; consequently by employing the fractional distillation principle of gas and coke ovens and collecting the vapors of distillation of the first stage in one collecting main, and the vapors of distillation of the second stage in another collecting main, the water vapor, carbonic acid and cadmium vapors may first be drawn off and isolated from the zinc vapors, while in the second operating stage the zinc vapors and carbon monoxide are drawn off into a separate collecting main. In this manner, a clean separation is obtained, thereby greatly improving the quality of the final metal product.

A further feature of the invention is to control the heating of the several distilling chambers so that the requisite temperatures can be maintained for the practical application of the two-stage distillation principle mentioned above. With this in view, the distilling chambers, which are assembled in the form of a battery, are provided with double heating walls intermediate such chambers, said walls being constituted of two series of heating flues, each series of heating flues being individual to their adjacent distilling chamber. The individual flame flues of the heating walls are communicably connected with regenerators that are individual to each two series of flame flues, a series located on each side of the respective distilling chamber, and separately controllable from the other regenerators of the battery; consequently each chamber may be operated as an individual unit as regards the heating of the ore mixture within the chamber. In this way it is possible to effect such regulation of the temperatures in the several distilling chambers that the double-stage distillation process may be effected and the desired separation of the zinc vapors from the impurities attained. The mixture of zinc vapors and carbon monoxide thus obtained in the second distillation stage is, according to a further feature of the invention, immediately subjected to a rectifying process. For this purpose the hot vapor mixture is passed through a column containing in its upper portion a reflux cooler or condenser. This cooler or condenser is effective to reduce the temperature of the gases and vapors passing through the column to about that of the melting temperature of the zinc, with the result that the zinc vapors are precipitated in the column and flow back through the column as liquid zinc. Thus the liquid zinc flows in counter-current with the vapors rising in the column, and the liquid zinc thus absorbs additional zinc from the counter-current flow of gas vapor mixture and becomes enriched in its passage to the bottom of the column. The gases which discharge from the rectifying column consist principally of carbon monoxide and are valuable for heating purposes, after being subjected to a purification process. The liquid zinc which collects at the bottom of the rectifying column continuously discharges from the column through a liquid seal.

In order to prevent percipitation of zinc from the gas vapor mixture, it is necessary that such mixture enter the column at substantially the temperature of its original production. For this purpose, the column is preferably built directly on the oven or battery and the collecting channel which leads from the different distilling chambers to the column is built low into the oven masonry at the top of the distilling chambers, so as to keep the gas vapor mixture hot until the mixture enters the rectifying column.

In the accompanying drawings, forming a part of this specification and showing, for purposes of exemplification, a preferred form and manner in which the invention may be embodied and practiced, but without limiting the claimed invention to such illustrative instance or instances:

Figure 1 is a crosswise vertical sectional elevation through a zinc recovery battery embodying features above specified and equipped with the improvements of the present invention, the view being taken longitudinally through a distilling chamber and a pair of regenerators;

Figure 2 is a vertical sectional elevation taken longitudinally of the battery; and Figure 3 is a horizontal section through the heating walls and distilling chambers.

The same characters of reference designate the same parts in each of the several views of the drawings.

In the embodiment illustrated in the drawings, the invention is incorporated in a battery of distilling chambers for the recovery of zinc and similar volatile metals from their ores. For convenience, the present description will be confined to the present illustrated embodiment of the invention in such a battery of distilling chambers; the novel features and improvements made by the invention are susceptible of other applications; hence the scope of the invention is not confined to the specific use and specific embodiment herein described as an illustrative example.

Referring to the drawings, the battery embodies in its construction a plurality of oven or distilling chambers 10 and a plurality of intermediate heating chambers or heating walls 10', the heating walls forming the opposite sides of each distilling chamber and being provided on each side of each distilling chamber with vertical flame flues individual to the distilling chamber. Below the coking chambers and heating walls are regenerators extending parallel therewith. For each distilling chamber there is a pair of air regenerators 12, 13, which communicate by means of ducts with the flame flues on the opposite sides of the distilling chamber, and two pairs of gas regenerators 12', 13', one pair of such gas regenerators communicating by ducts with the flame flues on one side of a distilling chamber, and the other pair of such gas regenerators communicating by ducts with the flame flues on the other side of the distilling chamber.

Each regenerator extends crosswise of the battery to the central longitudinal partition shown, and is a chamber containing open brickwork, commonly called checkerwork, with a distributing sole channel underneath such checkerwork, the channels forming the soles of such chambers and opening up into the checkerwork. The regenerators are heated, in alternation, by the hot combustion products that draw off from the flame or combustion flues hereinbefore mentioned, and then impart such heat to the medium that they feed to these flame flues. The reversal of flow through the regenerators and connected flues takes place crosswise of the battery, in accordance with the principle of operation set forth in my prior Patent, No. 818,033, dated April 17, 1906, and to permit the hot combustion products from the burning flame flues to pass into the down-flow operating flame flues each series of such flues of each heating wall communicates by ports with a horizontal bus flue. The several regenerators, when operating for outflow of combustion products, are communicably connected with waste gas flues 15 and 17 by means of flow boxes 14 and 16. These flow boxes are alternatively operable for placing said regenerators in communication with the outer air. The gas regenerators, when operating for inflowing, receive gas through valve-controlled gas supply pipes, indicated generally at G and leading from gas mains P.

At the top of each distilling chamber 10 are two distillate outlets, 18 and 20, one outlet, 18, being for the products of distillation of the first stage, and the other outlet, 20, being for the products of distillation of the second stage, namely, the zinc vapor and carbon monoxide mixture. The distillate outlets 18 of the several distilling chambers are communicably connected with a collecting main 19 recessed into the masonry, as shown in Fig. 1, and the distillate outlets 20 are also communicably connected with a second collecting main 21, also recessed into the masonry. The distillate outlets of each series 18 and 20 may be individually placed in communication with or cut off from their respective collecting mains 19 and 21 by means of stoppers 18′, 20′, adapted to be placed in position over the tops of the respective distillate outlets 18 and 20 and accessible through access flues extending to the top of the battery. The access flues are normally closed by suitable cover plates, as shown.

The collecting main 21 for the products of the second stage of the distillation process is communicably connected, by means of an inflow pipe 22, with the chamber 23 beneath the perforated partitions 24 of a rectifying column. In accordance with the present embodiment of the invention, this rectifying column is preferably built directly on the top of the oven battery,—for example, at about the center of the battery. In the shaft 26 of the rectifying column is placed a suitable filling 25,—for example, carbon in the form of charcoal or coke. In the upper part of the shaft 26 is suspended a steel receptacle 27, filled with liquid lead or zinc and functioning as a cooler for the vapor mixture which passes through the shaft 26. The cooler 27 cools the mixture down to a final temperature of approximately 500° centigrade, at which temperature the vapor mixture escapes through the outlet 28.

The operation of the above described apparatus is as follows: A charge of zinc ores mixed with carbon in the form of charcoal or coke is introduced into the distilling chambers. The chamber is then heated and kept approximately at a temperature of under 1000° centigrade, whereupon the first stage distillation of water vapor, carbonic acid and cadmium takes place. At this temperature, however, the zinc does not volatilize. During the first stage distillation of the water vapor, carbonic acid and cadmium, the collector of that distilling chamber is closed by the stopper 20′, and the vapors of the first stage distillation are drawn off into the collector 19 through the distillate outlet 18 and discharged for separate use. As above mentioned, the arrangement of the oven chamber, with its individual heating flues and individually controllable and reversible regenerators, makes it possible to operate each oven or distilling chamber as a unit and thereby to maintain the temperature so accurately that volatilizing of the zinc during the first operating stage is practically prevented.

When the water vapor and cadmium have been expelled from the charge, the temperature of the oven is raised to or above 1000° centigrade and the collector 19 is cut off from the chamber by means of the stopper 18′. The second stage distillation now begins and the distillate outlet 20 is placed in communication with the collecting main 21 by removing the stopper 20′, to permit the gases and vapors to pass to the collecting main 21. Because of the fact that the collecting main 21 is imbedded in the heavy oven roof and it is situated directly over the hot retorts or distilling chambers, no substantial temperature reduction takes place in the gases and vapors which pass through said main. Through this collecting main 21, which is preferably lined with pieces of charcoal (serving as reducing agents), the gas and vapor mixture goes directly into the rectifying column. In the rectifying column the mixture of gas and zinc vapor passes in counter-current with the liquid zinc produced by reflex condensation that is effected by means of the cooler 27, thereby separating practically the entire content of zinc vapor from the mixture. The liquid zinc collects in the hearth 29 of the rectifying column and may be continuously discharged through an overflow liquid seal channel 30.

The invention as hereinabove set forth is embodied in a particular form of construction, but may be variously embodied within the scope of the flames hereinafter made.

I claim:

1. In a process for recovering zinc and other similar volatile metals from their ores, the combination of steps that consists in: subjecting a charge of an ore of a volatile metal to a two-stage distillation process in which during the first stage the ore is heated to a temperature lower than the vaporization point of the metal to be recovered and in the second stage to a temperature as high as the vaporization point of such metal; withdrawing the products of distillation separately from both stages; and recovering the metal from the distillation products of the second stage; substantially as specified.

2. In a process for recovering zinc and other similar volatile metals from their ores, the combination of steps that consists in: subjecting a charge of an ore of a volatile metal to a two-stage distillation process in which during the first stage the ore is heated to a temperature lower than the vaporization point of the metal to be recovered and in the second stage to a temperature as high as the vaporization point of such metal; withdrawing the products of distillation separately from both stages, and subjecting the distillation products of the second stage to reflux condensation to precipitate the metal from such products, the precipitated metal passing in counter-current with the products of distillation; substantially as specified.

3. In a battery for recovering volatile metals, in combination: a plurality of distilling chambers; heating walls contiguous to such distilling chambers and constituted of two series of flame flues, and reversible regenerators communicably connected with the flues of said heating walls, the regenerators and communicably connected flues at the opposite sides of a distilling chamber being regulable as a unit independently of the regenerators and flame flues of the other distilling chambers; substantially as specified.

4. In a retort battery for the recovery of volatile metals, in combination: a plurality of distilling chambers; heating walls contiguous to said distilling chambers and respectively constituted of flame flues; a regenerative system embodying regenerators communicably connected with said flame flues; two vapor-collecting channels imbedded in the masonry above the distilling chambers, said channels being communicably connected by individually controllable ducts with the respective distilling chambers, substantially as specified.

5. In a retort battery for the recovery of volatile metals, in combination: a plurality of distilling chambers; heating walls contiguous to said distilling chambers and respectively constituted of flame flues; a regenerative system embodying regenerators communicably connected with said flame flues; two vapor-collecting channels, said channels being communicably connected by individually controllable ducts with the respective distilling chambers; substantially as specified.

6. In a retort battery for recovering volatile metals, in combination: a plurality of distilling chambers; heating walls contiguous thereto combined with a crosswise regenerative system communicably connected with said heating walls; a rectifying column mounted on the top of the battery and embodying a rectifying chamber filled with carbon and a reflux condenser in the upper portion of said chamber; a vapor-collecting main imbedded in the masonry of the battery above said distilling chamber and communicably connected by controllable ducts with each of said distilling chambers; and an inflow connection between said collecting main and said rectifying column; substantially as specified.

7. In a retort battery for recovering volatile metals, in combination: a plurality of distilling chambers; heating walls contiguous thereto combined with a crosswise regenerative system communicably connected with said heating walls; a rectifying column mounted on the top of the battery and embodying a rectifying chamber filled with carbon; a hearth below said chamber; an overflow metal discharge from the hearth and a reflux condenser in the upper portion of said chamber; a vapor-collecting main imbedded in the masonry of the battery above said distilling chambers and communicably connected by controllable ducts with each of said distilling chambers; and an inflow connection between said collecting main and said rectifying column; substantially as specified.

8. In a retort battery for recovering volatile metals, series of heating-chambers, and distilling-chambers intermediate the heating-chambers, combined with a series of regenerators below and parallel to the heating-chambers and communicating directly therewith, and means within said battery for drawing off and conducting away in vapor form the metals vaporized, substantially as specified.

9. A retort battery for recovering volatile metals provided with distilling-chambers, heating-chambers intermediate the distilling-chambers, and a series of alternating gas-regenerators and air-regenerators arranged below and communicating with the heating-chambers, and means within said battery for drawing off and conducting away in vapor form the metals vaporized, substantially as specified.

10. A retort battery for recovering volatile metals provided with parallel distilling chambers, series of heating-chambers intermediate each pair of distilling-chambers and alternating gas-regenerators and air-regenerators arranged below and communicating with the heating chambers, and means within said battery for drawing off and conducting away in vapor form the metals vaporized, substantially as specified.

HEINRICH KOPPERS.